United States Patent
Akiba (10) Patent No.: US 7,332,838 B2
(45) Date of Patent: Feb. 19, 2008

(54) MOTOR-FAN ASSEMBLY AND COMBUSTION-TYPE POWER TOOL EMPLOYING THE SAME

(75) Inventor: Yoshitaka Akiba, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/102,652

(22) Filed: Apr. 11, 2005

(65) Prior Publication Data

US 2005/0225184 A1   Oct. 13, 2005

(30) Foreign Application Priority Data

Apr. 9, 2004   (JP) ............................. 2004-115505

(51) Int. Cl.
 H02K 9/04 (2006.01)
 H02K 9/06 (2006.01)
 H02K 5/08 (2006.01)
 F16D 1/00 (2006.01)
 F16D 15/00 (2006.01)

(52) U.S. Cl. ..................... 310/62; 310/63; 416/93 R; 417/423.14

(58) Field of Classification Search .............. 310/62, 310/63; 416/170 R, 93 R, 244 R; 417/423.14
See application file for complete search history.

(56) References Cited

U.S. PATENT DOCUMENTS

| | | | | |
|---|---|---|---|---|
| 870,136 A * | 11/1907 | Shaw | .......................... | 416/238 |
| 985,491 A * | 2/1911 | Andrade | ....................... | 29/244 |
| 1,400,032 A * | 12/1921 | Dickey | ....................... | 403/257 |
| 1,463,556 A * | 7/1923 | Reed | .......................... | 416/240 |
| 2,098,107 A * | 11/1937 | Preston | .................... | 416/214 R |
| 3,252,497 A * | 5/1966 | McGillis | ...................... | 126/95 |
| 3,307,634 A * | 3/1967 | Bihlmire | ..................... | 416/135 |
| 3,829,722 A * | 8/1974 | Rosenthal et al. | ............ | 310/50 |
| 4,065,219 A * | 12/1977 | Levine | ....................... | 403/287 |
| 5,197,646 A | 3/1993 | Nikolich | | |
| 5,249,777 A * | 10/1993 | Herving | ...................... | 254/289 |
| 6,065,733 A * | 5/2000 | Correa et al. | ............... | 248/675 |
| 6,082,969 A * | 7/2000 | Carroll et al. | .............. | 416/192 |
| 2004/0101406 A1* | 5/2004 | Hoover | ....................... | 416/140 |
| 2005/0036893 A1* | 2/2005 | Decker | ................... | 416/244 A |

FOREIGN PATENT DOCUMENTS

| | | | |
|---|---|---|---|
| JP | 08-319993 A | * | 12/1996 |
| JP | 10-205493 A | * | 8/1998 |
| JP | 2003-023750 A | * | 1/2003 |

* cited by examiner

*Primary Examiner*—Tran Nguyen
(74) *Attorney, Agent, or Firm*—Antonelli, Terry, Stout & Kraus, LLP.

(57) ABSTRACT

To connect a motor shaft to a fan, a connection rod is used that is symmetrical in shape with respect to a longitudinal axis of the connection rod. The connection rod includes a first part formed with a hole in coaxial with the longitudinal axis, and a second part formed at least partially with a threaded portion. The motor shaft is attached to the connection rod by inserting the motor shaft into the hole of the first part of the connection rod. The fan is attached to the connection rod by inserting the second part of the connection rod into the center hole of the hub portion and supports the fan with a pair of nuts, one at one side of the hub portion and another at another side of the hub portion wherein the nuts are moved toward each other with the hub portion interposed therebetween.

14 Claims, 6 Drawing Sheets

MOTOR-FAN ASSEMBLY AND COMBUSTION-TYPE POWER TOOL EMPLOYING THE SAME

BACKGROUND OF THE INVENTION

1. Field of the Invention

The present invention relates to a motor-fan assembly and a combustion-type power tool, such as nail gun, employing the same.

2. Description of the Related Art

A fan for agitating a gaseous matter or mixing two or more kinds of gaseous matters has been used in a variety of situations. Typically, a motor is a source for driving the fan. Attachment of the motor shaft to the fan has conventionally been made as shown in FIG. 1.

Figure 1:
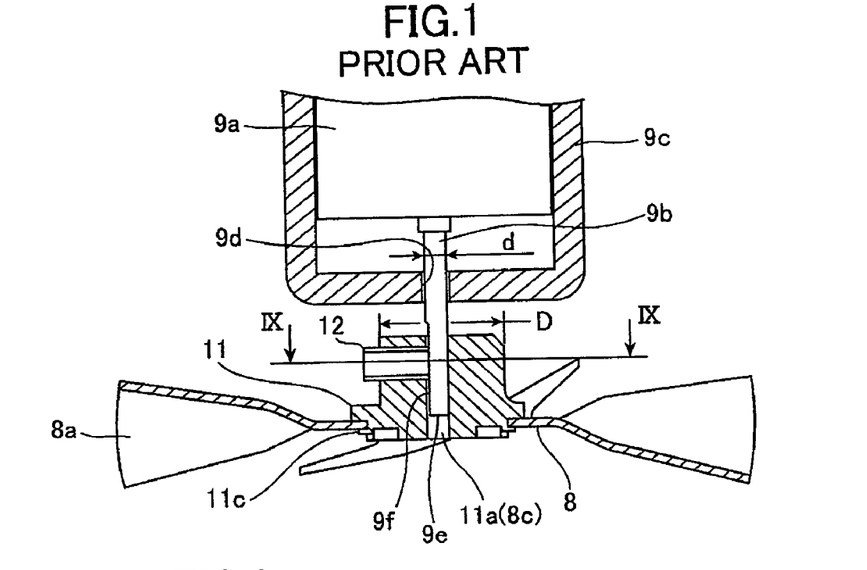
FIG. 1 is a partial cross-sectional view showing a conventional motor-fan assembly.

FIG. 1 is a partial cross-sectional view showing a conventional motor-fan assembly. A motor 9a is accommodated in a casing 9c. The casing 9c is formed with a hole 9d for allowing the motor shaft 9b to pass therethrough. The motor shaft 9b protrudes outward from the casing 9c through the hole 9d. A fan 8 is fixedly attached to the tip end portion 9e of the shaft 9b. The tip end portion 9e of the shaft 9b has a D-shaped cross-section. Specifically, a flat portion 9f is formed on the outer periphery of the shaft 9b to extend in a longitudinal direction of the shaft 9b.

Figure 8:
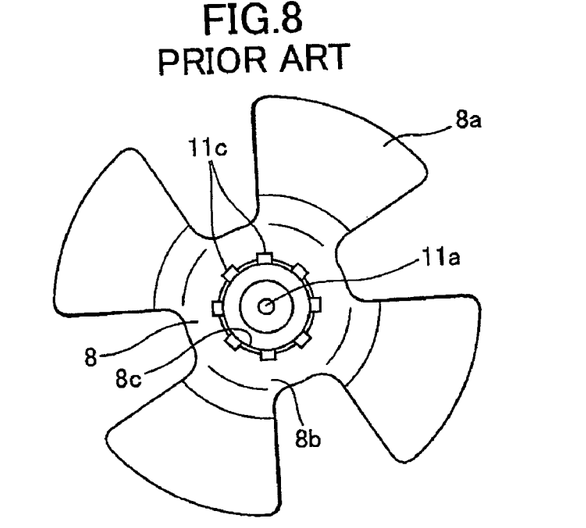
FIG. 8 is a bottom view showing the assembled fan unit and connection block shown in FIG. 7.
Figure 9:
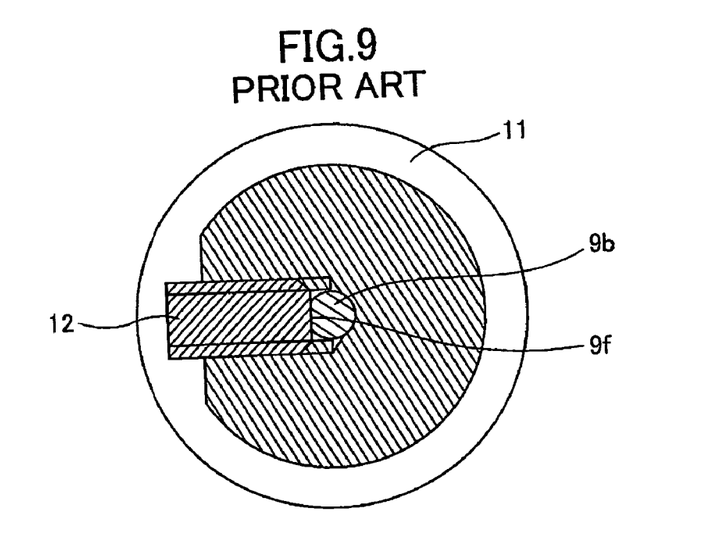
FIG. 9 is a cross-sectional view cut along the line IX-IX in FIG. 1.

As best shown in FIG. 8, the fan 8 has a hub portion 8b and a plurality of blades 8a (four in the illustrated example) extending radially outwardly from the hub portion 8b and also equally angularly spaced apart from one another around the hub portion 8b. A center hole 8c is formed in the hub portion 8b.

Figures 2, 3:
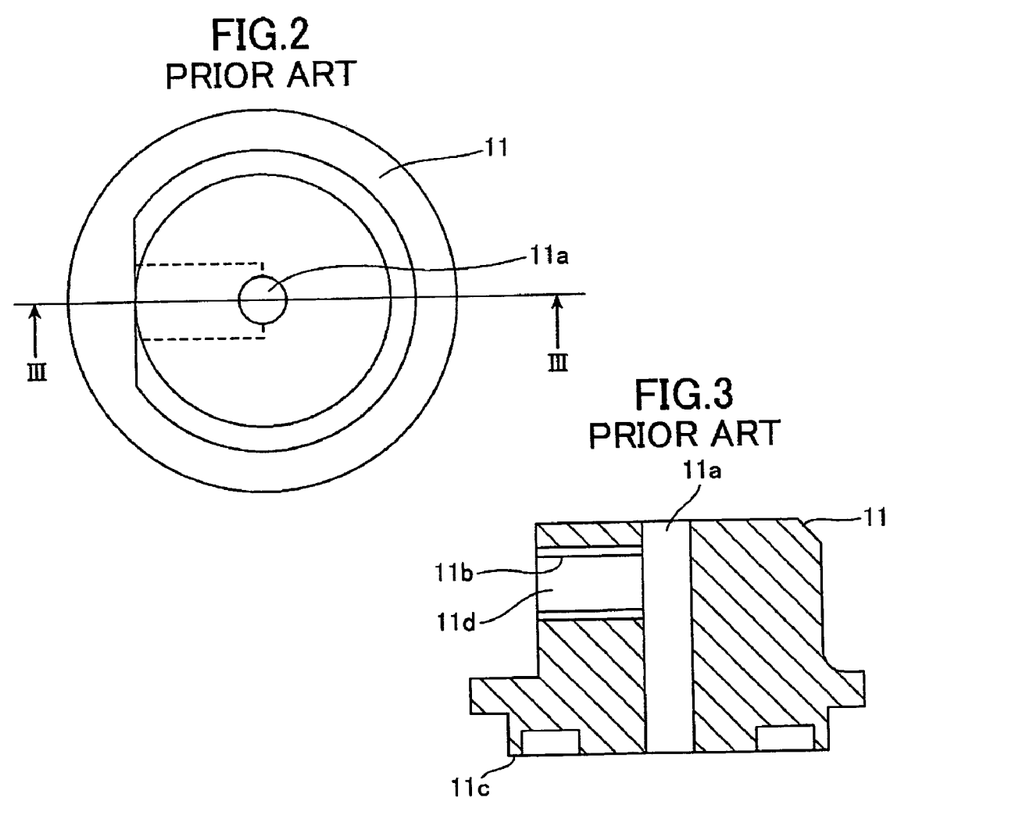
FIG. 2 is a top view showing a connection block used in the assembly shown in FIG. 1.
FIG. 3 is a cross-sectional view cut along the line III-III in FIG. 2.
Figure 4:
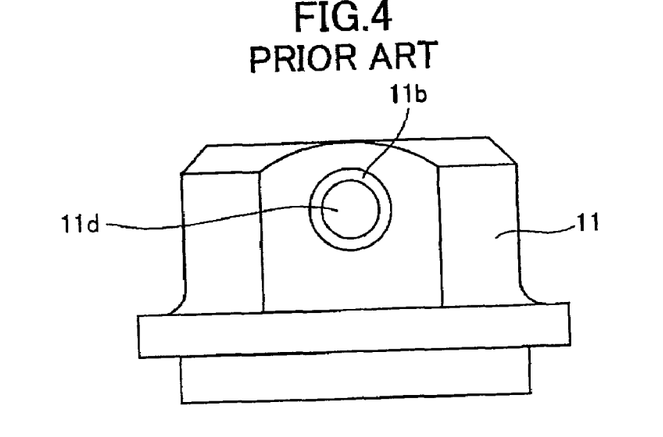
FIG. 4 is a side view showing the connection block shown in FIG. 2.
Figure 5:
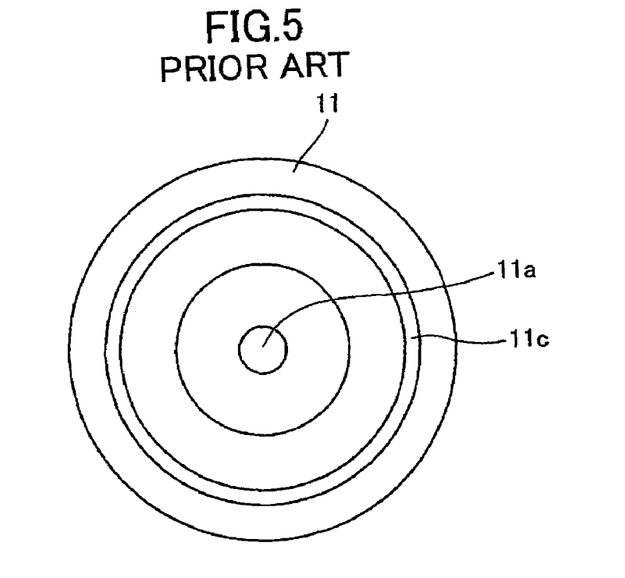
FIG. 5 is a bottom view showing the connection block shown in FIG. 2.

A connection block 11 is used to connect the motor shaft 9b and the fan 8. FIGS. 2 through 5 show the connection block 11, in which FIG. 2 is a top view, FIG. 3 is a cross-sectional view cut along the line III-III in FIG. 2, FIG. 4 is a side view, and FIG. 5 is a bottom view. The connection block 11 is an intermediate member disposed between the motor shaft 9b and the fan 8. Specifically, the motor shaft 9b is secured to the connection block 11 and the fan 8 is fixed to the connection block 11.

As shown in FIGS. 2 and 3, a through-hole 11a is formed in the connection block 11 for allowing the motor shaft 9b to be inserted thereinto. A lateral hole 11d is also formed in the connection block 11. The lateral hole 11d is open to the outer periphery of the connection block 11 and extends perpendicular to the direction in which the through-hole 11a extends. The lateral hole 11d extends to reach the through-hole 11a. A female screw 11b is threaded in the inner periphery of the hole 11d so that a male screw 12 can threadingly engage the female screw 11b as shown in FIG. 1.

Figure 6:
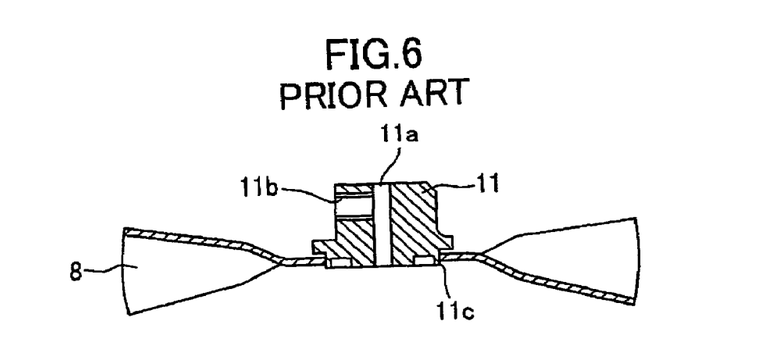
FIG. 6 is a cross-sectional view showing a fan unit and a connection block that are used in the assembly shown in FIG. 1.
Figure 7:
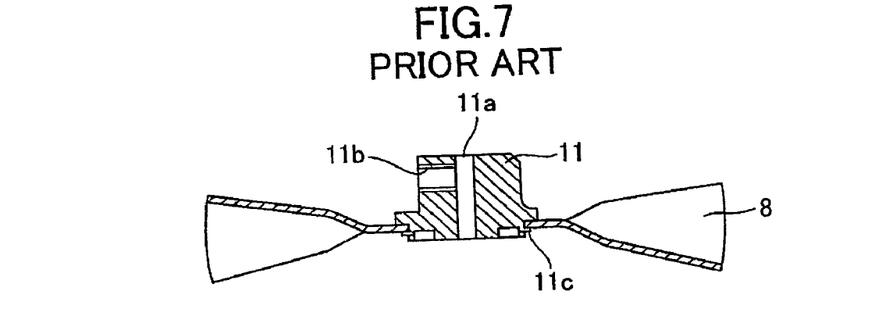
FIG. 7 is a cross-sectional view showing an assembled fan unit and connection block.

To assemble the motor 9 and the fan 8 using the connection block 11, the fan 8 is firstly attached to the connection block 11 by caulking. FIG. 6 shows the fan 8 and the connection block 11 before caulking, FIG. 7 shows the fan 8 and the connection block 11 after caulking. FIG. 8 is a bottom view showing the fan 8 caulked to the connection block 11. As shown in FIGS. 3 and 8, the connection block 11 is provided with a plurality of caulking pieces 11c (eight in the illustrated example) at the lower peripheral portion of the connection block 11. The caulking pieces 11c are equally angularly spaced apart from one another around the lower periphery of the connection block 11. As shown in FIG. 6, to place the connection block 11 and the fan 8 in an assembling state, the caulking pieces 11c are slided down along the inner wall of the center hole 8c of the hub portion 8b until the caulking pieces 11c protrude outwardly from the center hole 8c. Then, the caulking pieces 11 are bended radially outwardly, whereby the fan 8 is attached to the connection block 11.

To attach the motor shaft 9b to the connection block 11 with the fan 8 attached thereto, the motor shaft 9b is inserted into the through-hole 11a of the connection block 11 while directing the flat portion 9f of the motor shaft 9b toward the lateral hole 11d. The male screw 12 is threadingly engaged with the female screw 11b formed in the lateral hole 11d. The male screw 12 is advanced deeper until the tip end thereof is brought into abutment with the flat portion 9f of the shaft 9b. Abuttment of the male screw 12 with the flat portion 9f fixedly attaches the motor shaft 9b to the connection block 11 and prevents the motor shaft 9b from detaching from the connection block 11 during rotation.

One problem with the above-described conventional motor-fan assembly is that formation of the flat portion 9f on the motor shaft 9b requires a special machining, which causes an increase of cost in manufacturing the assembly. Another problem is that the male screw 12 and the lateral hole lid for accepting the male screw 12 are unsymmetrical elements in the assembly, causing rotational balance of the fan 8 to degrade. When vibrations of the motor shaft 9b occur as a result of the rotational imbalance of the fan 8, the motor shaft 9b may contact the hole 9d of the motor casing 9c during rotation As a result, the service life of the motor 9a is shortened.

SUMMARY OF THE INVENTION

The present invention has been made to solve the aforementioned problems, and accordingly it is an object of the invention to provide a stably operable motor-fan assembly.

Another object of the invention is to provide a motor-fan assembly having a prolonged service life.

Still another object of the invention is to provide a motor-fan assembly that can be manufactured at a low cost.

To achieve the above and other objects, there is provided a motor-fan assembly that includes a motor, a fan, and a connection rod. The motor has a shaft that extends in a first direction and outputs rotational force. The connection rod connects the shaft of the motor to the fan. A cross-section of the shaft of the motor and the connection rod cut along the imaginary longitudinal axis is symmetrical in shape with respect to the imaginary longitudinal axis.

It is desirable that the connection rod have a circular cross-section anywhere along an entire length of the connection rod. The circular cross-section appears when the connection rod is cut along a line extending in a second direction perpendicular to the first direction.

It is also desirable that the connection rod be formed with a hole in coaxial with the imaginary longitudinal axis, and the shaft of the motor is force-fitted into the hole of the connection rod to thereby secure the shaft of the motor to the connection rod. Alternatively, the shaft of the motor may be loosely inserted into the hole of the connection rod and secured to the connection rod with an adhesive material.

First and second tightening members both engageable with the connection rod may further be provided to secure the fan to the connection rod. In a state where the shaft of the motor is inserted into the center hole formed in the hub portion of the fan, the first tightening member engaged with the connection rod at one side of the hub portion and the second tightening member engaged with the connection rod at another side of the hub portion are moved toward each other with the hub portion interposed therebetween, thereby securing the fan to the connection rod.

The connection rod, the first tightening member, and the second tightening member are made from the same material which may be steel.

According to another aspect of the invention, there is provided a connector for connecting a motor shaft to a fan. The connector includes a connection rod, and first and second tightening members. The connection rod has an imaginary longitudinal axis extending in a first direction, and a circular cross-section anywhere along an entire length of the connection rod. The circular cross-section appears when the connection rod is cut along a line extending in a second direction perpendicular to the first direction. The connection rod includes a first part formed with a hole in coaxial with the imaginary longitudinal axis for receiving the motor shaft, and a second part formed at least partially with an engaging portion. The first tightening member is engageable with the engaging portion of the second part, and the second tightening member also engageable with the engaging portion of the second part, wherein the first tightening member and the second tightening member are used to attach the fan to the connection rod.

The motor-fan assembly and connector as described above are particularly advantageous when used in a combustion-type power tool.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

A motor-fan assembly according to a preferred embodiment of the invention will be described with reference to FIGS. 10 through 15.

Figure 10:
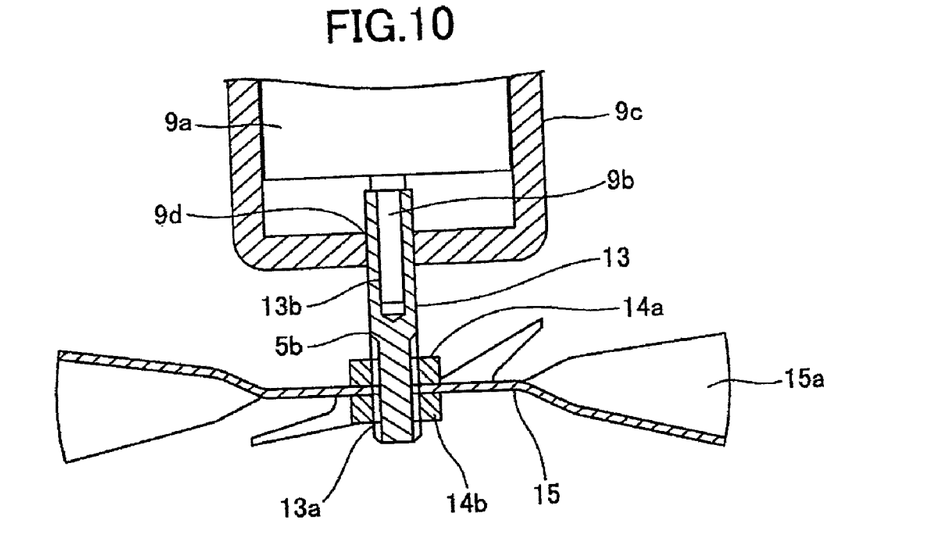
FIG. 10 is a cross-sectional view showing a motor-fan assembly according to an embodiment of the invention.
Figure 11:
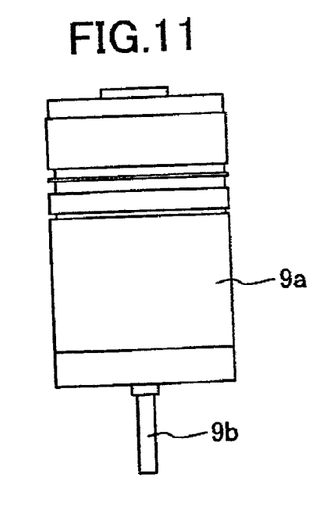
FIG. 11 is a side view showing a motor employed in the assembly shown in FIG. 10.

As shown in FIG. 10, the motor-fan assembly according to the embodiment of the invention includes a motor 9a, a fan 15, a connection rod 13, a first nut 14a serving as a tightening member, and a second nut 14b serving as the tightening member in cooperation with the first nut 14a. In the illustrated embodiment, a casing 9c accommodates the motor 9a. As shown in FIG. 11, the motor 9a has a rotating shaft 9b for outputting a rotational force of the motor 9a. Unlike the conventional shaft shown in FIG. 1, the shaft 9b according to this embodiment is not formed with a flat portion that extends in the longitudinal direction but a rod-like member having a circular cross-section anywhere along the entire length of the shaft 9b. The casing 9c is formed with a hole 9d from which the shaft 9b penetrates out to the casing 9c.

Figure 12:
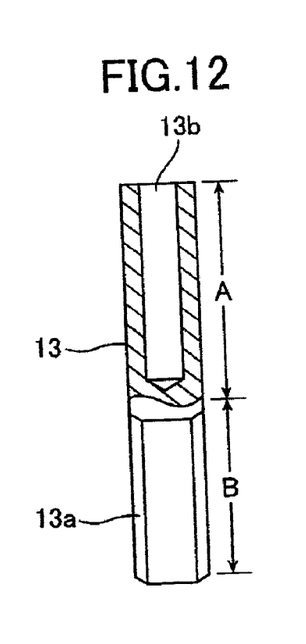
FIG. 12 is a partial cross-sectional view showing a connection rod used in the assembly shown in FIG. 10.

The connection rod 13 has a circular cross-section anywhere along the entire length thereof. The circular cross-section appears when the connection rod 13 is cut along a line extending in a direction perpendicular to the axial direction of the connection rod 13. As shown in FIG. 12, the connection rod 13 includes a first part "A" formed with a hole 13b in coaxial with the longitudinal axis of the rod 13, and a second part "B" formed at least partially with a male screw portion 13a.

Figure 13:
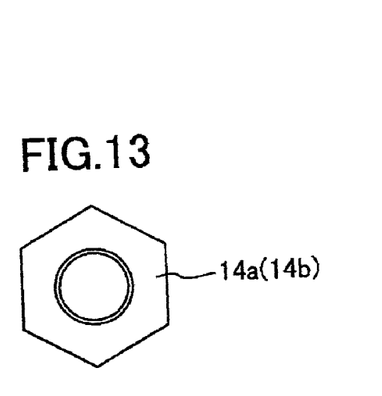
FIG. 13 is a front view showing a nut used in the assembly shown in FIG. 10.

As shown in FIG. 13, first and second nuts 14a, 14b are used in conjunction with the connection rod 13 to connect the motor shaft 9b to the fan 15. Both the first and second nuts 14a, 14b are formed with female screw portions that are threadingly engageable with the male screw portion formed in the second part "B" of the connection rod 13 shown in FIG. 12.

Figure 14:
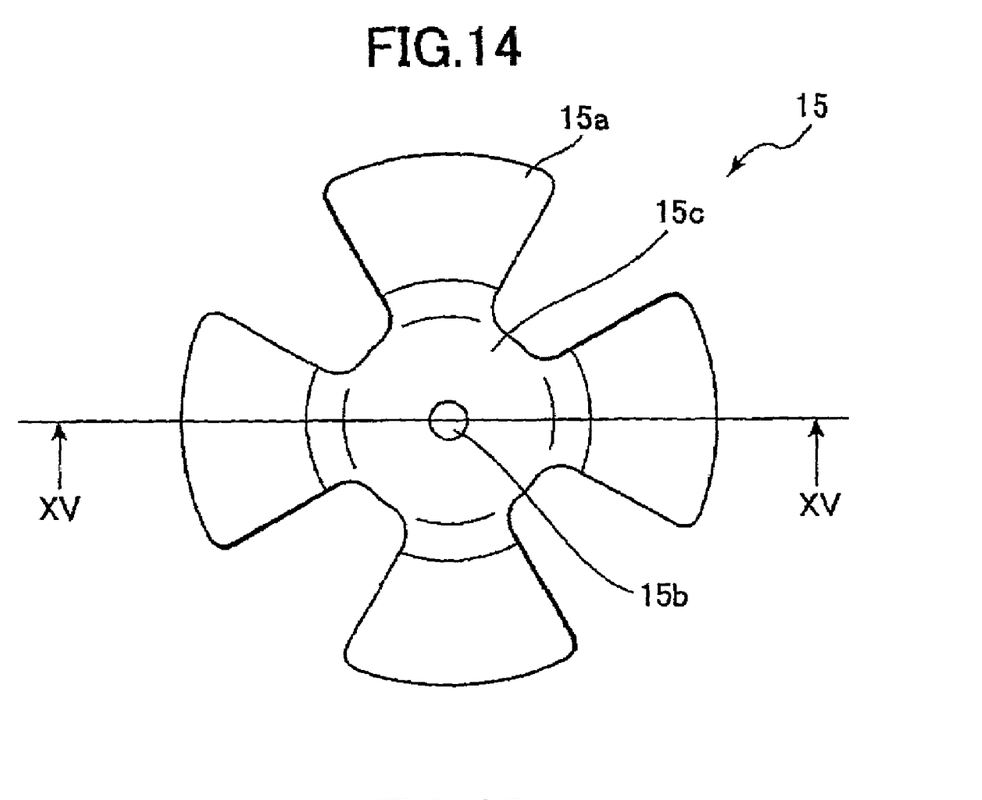
FIG. 14 is a front view showing a fan used in the assembly shown in FIG. 10.
Figure 15:
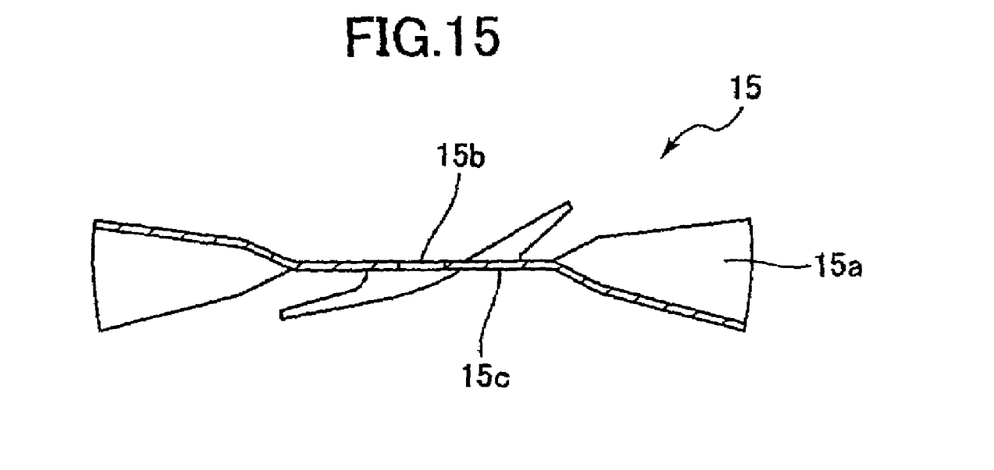
FIG. 15 is a cross-sectional view cut along the line XV-XV in FIG. 14.

As shown in FIGS. 14 and 15, the fan 15 has a hub portion 15c and a plurality of blades 15a (four in the illustrated embodiment) extending radially outwardly from the hub portion 15c and also equally angularly spaced apart from one another around the hub portion 15c. A center hole 15b is formed in the hub portion 15c.

To assemble the motor 9a and the fan 15 using the connection rod 13 and the two nuts 14a, 14b, the fan 15 is attached to the connection rod 13 using the two nuts 14a, 14b. Specifically, the first nut 14a is brought into engagement with the connection rod 13 from the end of the second part "B" and threadingly moved along the axial direction to a position remote from the end of the second part "B". Next, the fan 15 is brought into engagement with the connection rod 13. That is, the connection rod 13 is inserted into the hole 15b of the fan 15. Then, the second nut 14b is brought into engagement with the connection rod 13 from the end of the second part "B" and moved along the axial direction to sandwich the fan 15 together with the first nut 14a. The fan 15 can be firmly held on the connection rod 13 if the nuts 14a, 14b are axially moved toward each other.

The motor shaft 9b is attached to the connection rod 13 by force-fitting the motor shaft 9b into the hole 13b of the first part "A" of the connection rod 13. Attachment of the motor shaft 9b to the connection rod 13 may be performed before or after the attachment of the fan 15 to the connection rod 13. However, the order of attachment of the motor shaft 9b and the fan 15 to the connection rod 13 is typically determined depending on apparatuses, machines, or tools in which the motor-fan assembly is installed.

The motor-fan assembly thus provided is particularly advantageous when used in a combustion-type power tool, such as a combustion-type nail gun to be described hereinafter with reference to FIG. 16. A basic structure of the combustion-type nail gun is well known in the art as disclosed in U.S. Pat. No. 5,197,646. In the following description, the terms "upper", "lower", "above", "below", "upward", "downward" and the like will be used assuming that the combustion-type nail gun 1 is disposed in an orientation in which the nail is fired vertically downward.

Figure 16:
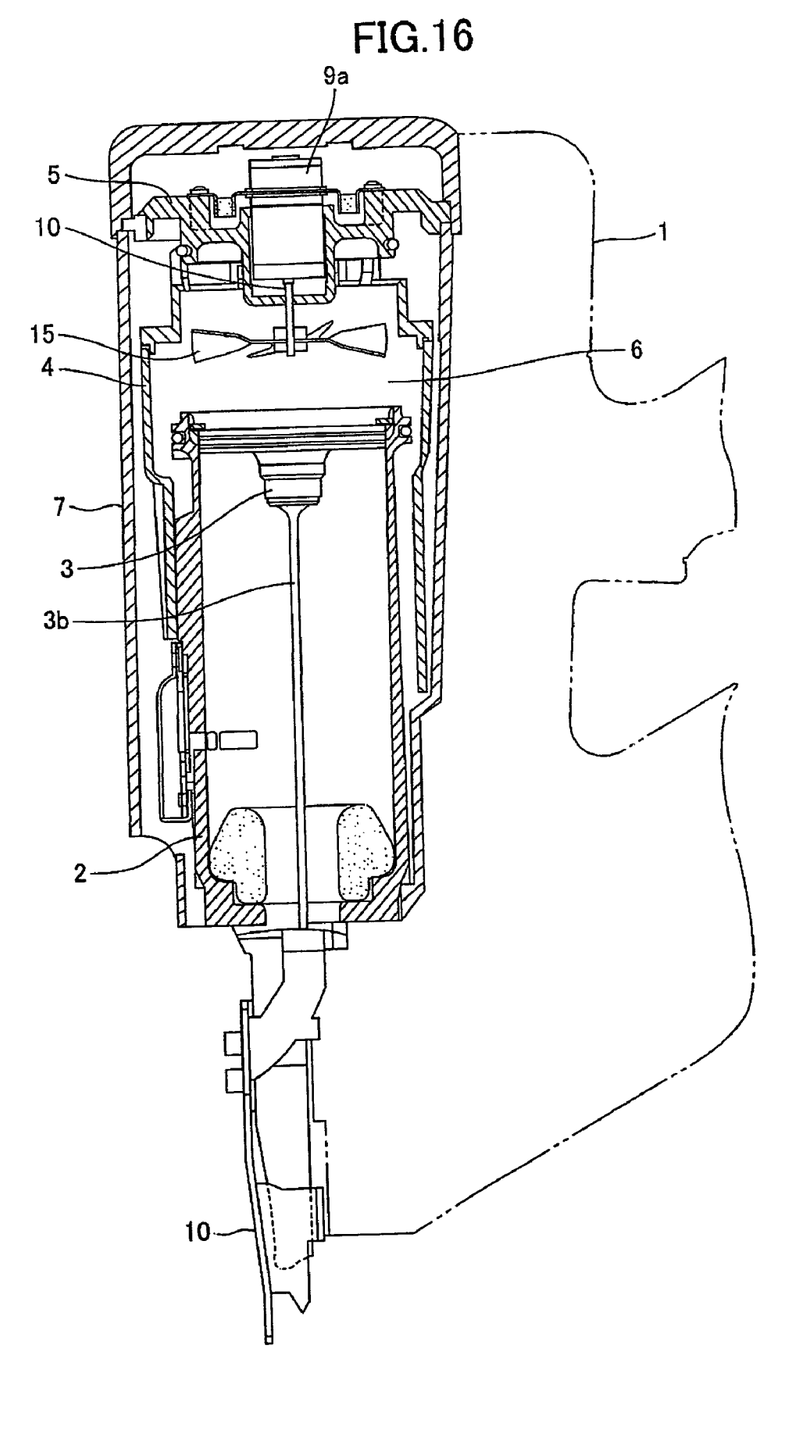
FIG. 16 is a cross-section view showing an essential portion of a combustion-type nail gun.

The combustion-type nail gun 1 shown in FIG. 16 has a housing 7 constituting an outer frame. A gas canister (not shown) containing therein a combustible liquidized gas is detachably installable in a canister housing portion separate from the housing 7.

A head cap 5 serving as a head section is secured to the top of the housing 7 and substantially covers the open top end of the housing 7. The head cap 5 supports a motor 9a for rotating a fan 15. In this example, the head cap 5 serves as the casing 9c shown in FIG. 10. The head cap 5 also supports an ignition plug (not shown) ignitable upon manipulation to the trigger switch (not shown). A head switch (not shown) is provided in the housing 7 for detecting an uppermost stroke end position of the combustion chamber frame 4 when the nail gun 1 is pressed against the workpiece. Thus, the head switch can be turned ON when the push lever 10 is elevated to a predetermined position for starting rotation of the motor 9a, thereby starting rotation of the fan 15.

The combustion-chamber frame 4 is provided in the housing 7 and is movable in the lengthwise direction of the housing 7. The uppermost end of the combustion-chamber frame 4 is abuttable on the lower surface of the head cap 5.

The combustion-chamber frame 4 is moved in accordance with the movement of the push lever 10. The cylinder 2 is fixed to the housing 7. An outer peripheral surface of the cylinder 2 is in sliding contact with the inner circumference of the combustion-chamber frame 4 for guiding the movement of the combustion-chamber frame 4. The cylinder 2 has an axially intermediate portion formed with an exhaust hole (not shown). An exhaust-gas check valve (not shown) is provided to selectively close the exhaust hole.

A piston 3 is slidably and reciprocally movably provided in the cylinder 2. The piston 3 divides an inner space of the cylinder 2 into an upper space above the piston 3 and a lower space below the piston 3. The driver blade 3b extends downwards from a lower side of the piston 3, so that a tip end of the driver blade 3b can strike against the nail (not shown). When the upper end of the combustion-chamber frame 4 abuts on the head cap 5, the head cap 5, the combustion-chamber frame 4, and the upper cylinder space above the piston 3 define in combustion a combustion chamber 6. When the combustion chamber frame 4 is separated from the head cap 5, a first flow passage in communication with the atmosphere is provided between the head cap 5 and the upper end of the combustion chamber frame 4, and a second flow passage in communication with the first flow passage is provided between the combustion chamber frame 4 and the upper end portion of the cylinder 2. The second flow passage allows a combustion gas and a fresh air to pass along the outer peripheral surface of the cylinder 2 for discharging these gas through the exhaust port of the housing 7. Further, an intake port (not shown) is formed for supplying a fresh air into the combustion chamber 6, and the exhaust hole is adapted for discharging combustion gas generated in the combustion chamber 6.

The fan 15 and the fuel ejection port (not shown) are disposed in or open to the combustion chamber 6. Rotation of the fan 15 performs the following three functions. First, the fan 15 stirs and mixes the air with the combustible gas as long as the combustion-chamber frame 4 remains in abutment with the head cap 5. Second, after the mixed gas has been ignited, the fan 15 causes turbulence of the air-fuel mixture, thus promoting the turbulent combustion of the air-fuel mixture in the combustion chamber 6. Third, the fan performs scavenging such that the exhaust gas in the combustion chamber 6 can be scavenged therefrom and also performs cooling to the combustion chamber frame 4 and the cylinder 2 when the combustion-chamber frame 4 moves away from the head cap 5 and when the first and second flow passages are provided.

Assembling the motor 9a, the connection rod 13, and fan 15 in the combustion-type nail gun 1 is performed in the following manner. Firstly, the motor shaft 9b is force-fitted into the hole 13b of the connection rod 13 to be integral therewith. Then, the motor 9a with the connection rod 13 attached thereto is mounted on the head cap 5. In the state in which the motor 9a is mounted on the head cap 5, the connection rod 13 projects into the combustion chamber 6. Subsequently, the fan 15 is attached to the connection rod 13 using the two nuts 14a, 14b.

Operation of the combustion-type nail gun 1 will next be described. In non-operational state of the combustion-type nail gun 1, the push lever 10 is biased downward by the biasing force of the compression coil spring (not shown) Thus, the uppermost end of the combustion-chamber frame 4 is spaced away from the head cap 5 because the combustion-chamber frame 4 is in association with the push lever 10. Further, a part of the combustion-chamber frame 4 which part defines the combustion chamber 6 is also spaced from the top portion of the cylinder 2. Hence, the first and second flow passages are provided. In this condition, the piston 3 stays at the top dead center in the cylinder 2.

With this state, if the push lever 10 is pushed onto the workpiece while holding the handle by a user, the push lever 10 is moved upward against the biasing force of the compression coil spring. At the same time, the combustion-chamber frame 4 which is connected to the push lever 10 is also moved upward, closing the above-described flow passages. Thus, the sealed combustion chamber 6 is provided.

Further, in accordance with the movement of the push lever 10, the combustion chamber frame 4 reaches the uppermost stroke end whereupon the head switch is turned ON to start rotation of the fan 15. Rotation of the fan 15 stirs and mixes the combustible gas with air in the combustion chamber 6 in order to form a combustion gas. In this state, when the trigger switch provided at the handle is turned ON, spark is generated at the ignition plug (not shown) to ignite the combustible gas.

As a result of combustion, volumetric expansion of the combustion gas occurs within the combustion chamber 6 to move the piston 3 downwardly. Accordingly, the driver blade 3b drives the nail into the workpiece.

After the nail driving, the combustion gas is discharged out of the cylinder 2 through the exhaust hole of the cylinder 2 When the inner space of the cylinder 2 and the combustion chamber 6 becomes the atmospheric pressure, the check valve (not shown) provided at the exhaust hole is closed.

Combustion heat of the combustion gas is absorbed into the cylinder 2 and other components, so that a volume of the combustion gas is decreased. Thus, the pressure in the sealed space in the cylinder 2 above the piston 3 drops to less than the atmospheric pressure (creating a so-called "thermal vacuum"). Accordingly, the piston 3 is moved back to the initial top dead center position.

Then, the trigger switch is turned OFF, and the user lifts the combustion-type nail gun 1 from the workpiece for separating the push lever 10 from the workpiece. As a result, the push lever 10 and the combustion-chamber frame 4 move downward due to the biasing force of the compression coil spring to restore the initial state.

In the motor-fan assembly used in the combustion-type nail gun, the connection rod 13 and the two nuts 14a, 14b are made from the same material. In the above-described embodiment, these components are made from steel. Steel is advantageous in terms of strength as compared with aluminum used in the conventional connection block 11. The use of steel in the connection rod 13 enables the nominal diameter of the male screw portion to be large. Therefore, the connection rod 13 made from steel would not be damaged or broken even if the nuts threadingly engaged with the connection rod 13 are tightened with high torque. In the illustrated embodiment, the connection rod 13 has a diameter of 4 mm and the male screw portion 13a has a nominal diameter of M4.

The fan 15 is made from aluminum. The conventional motor-fan assembly used in the combustion-type nail gun uses the connection block 11 and fan 15 both made from aluminum that is lighter in specific gravity than steel The use of aluminum in the connection block 11 contemplates to improve the start-up rotational characteristic of the fan 8. On the other hand, the motor-fan assembly according to the preferred embodiment uses the connection rod made from steel that is heavier in specific gravity than aluminum. The use of heavy specific gravity material in the assembly is obviously disadvantageous in terms of improvement of the start-up rotational characteristic of the fan. However, the connection rod 11 is symmetry in shape with respect to the longitudinal axis and has a diameter close to the diameter of the motor shaft 9b. Therefore, moment of inertia of the connection rod 11 is relatively small as compared with the conventional connection block 11. As a result, the start-up rotational characteristic of the motor-fan assembly according to the present embodiment is as good as that of the conventional assembly.

While the invention has been described in detail with reference to specific embodiments thereof, it would be apparent to those skilled in the art that various changes and modifications may be made therein without departing from the spirit of the invention, the scope of which is defined by the attached claims.

For example, while the embodiment describes that the motor shaft 9b is force-fitted into the hole 13b of the connection rod 13 to prevent slippage of the shaft 9b during rotation, an adhesive material may be used to achieve the same effect instead of force-fitting the motor shaft 9b into the hole 13b. Specifically, the shaft 9b may be loosely inserted into the hole 13b of the connection rod 13 and the adhesive material is filled in the space formed between the inner wall of the hole 13b and the outer peripheral surface of the shaft 9b.

Further, in the above-described embodiment, the motor shaft 9b attached to the connection rod 13 has a circular cross-section when cut along a line extending in a direction perpendicular to the axial direction. However, the connection rod 13 is capable of attaching the motor shaft having a D-shaped cross-section as described with reference to FIG. 1.

Furthermore, the number of nuts used in tightening the fan to the connection rod 13 is not limited to two but two or more nuts may be place at one side of the fan 13 and also two or more nuts may place at another side thereof. Also, the number of the blades 15a formed in the fan 15 is not limited to four as described in the preferred embodiment.

What is claimed is:

1. A motor-fan assembly for use in a combustion-type power tool, comprising:
    a motor having a shaft that extends in a first direction and outputs rotational force;
    a fan having a hub portion which is formed with a center hole; and
    a connection rod that connects the shaft of the motor to the fan, the connection rod having an imaginary longitudinal axis extending in the first direction,
    wherein a cross-section of the shaft of the motor and the connection rod cut along the imaginary longitudinal axis is symmetrical in shape with respect to the imaginary longitudinal axis,
    wherein the connection rod is formed with a hole in coaxial with the imaginary longitudinal axis, and the shaft of the motor is inserted into the hole of the connection rod, and a first and a second tightening member, each being engageable with the connection rod, wherein the connection rod is inserted into the hole of the hub and the fan is secured to the connection rod by the first tightening member engaged with the connection rod at one side of the hub portion and the second tightening member engaged with the connection rod at another side of the hub portion,
    wherein the connection rod and the first and the second tightening members are made from a same material of steel, and the fan is made from aluminum.

2. The motor-fan assembly according to claim 1, wherein the connection rod has a circular cross-section anywhere along an entire length of the connection rod, the circular cross-section appearing when the connection rod is cut along a line extending in a second direction perpendicular to the first direction.

3. The motor-fan assembly according to claim 1, wherein the shaft of the motor is force-fitted into the hole of the connection rod.

4. The motor-fan assembly according to claim 1, wherein the shaft of the motor is inserted into the hole of the connection rod and secured to the connection rod with an adhesive material.

5. The motor-fan assembly according to claim 1, the first tightening member and the second tightening member are threadingly engaged with the connection rod.

6. A motor-fan assembly comprising:
    a motor having a shaft that extends in a first direction and outputs rotational force;
    a fan having a hub portion formed with a center hole;
    a connection rod having an imaginary longitudinal axis extending in the first direction, and a circular cross-section anywhere along an entire length of the connection rod, the circular cross-section appearing when the connection rod is cut along a line extending in a second direction perpendicular to the first direction, the connection rod including a first part formed with a hole in coaxial with the imaginary longitudinal axis, and a second part formed at least partially with an engaging portion;
    a first tightening member engaged with the engaging portion of the second part; and
    a second tightening member engaged with the engaging portion of the second part;
    wherein the shaft of the motor is attached to the connection rod by inserting the shaft of the motor into the hole of the first part of the connection rod, and the fan is attached to the connection rod by inserting the second part of the connection rod into the center hole of the hub portion and supporting the fan with the first tightening member at one side of the hub portion and the second tightening member at another side of the hub portion, the first tightening member and the second tightening member being moved toward each other with the hub portion interposed therebetween, and wherein the connection rod and the first and the second tightening members are made from a same material of steel, and the fan is made from aluminum.

7. The motor-fan assembly according to claim 6, wherein the shaft of the motor has a circular cross-section when cut along a line extending in the second direction.

8. The motor-fan assembly according to claim 6, wherein the shaft of the motor has a D-shaped cross-section when cut along a line extending in the second direction.

9. A connector for connecting a motor shaft to a fan, the connector comprising:

a connection rod having an imaginary longitudinal axis extending in a first direction, and a circular cross-section anywhere along an entire length of the connection rod, the circular cross-section appearing when the connection rod is cut along a line extending in a second direction perpendicular to the first direction, the connection rod including a first part formed with a hole in coaxial with the imaginary longitudinal axis for receiving the motor shaft, and a second part formed at least partially with an engaging portion;

a first tightening member engageable with the engaging portion of the second part; and a second tightening member engageable with the engaging portion of the second part, the first tightening member and the second tightening member being used to attach the fan to the connection rod, wherein the connection rod and the first and the second tightening members are made from a same material of steel and the fan is made from aluminum.

10. A combustion-type power tool comprising:

a housing having one end;

a head section disposed near the one end of the housing and formed with a fuel passage;

a cylinder secured to an inside of the housing;

a piston slidably disposed in the cylinder and reciprocally movable in an axial direction of the cylinder, the piston driving the cylinder into an upper cylinder space above the piston and a lower cylinder space below the piston;

a combustion-chamber frame movably provided in the housing, the combustion-chamber frame having one end abuttable on and separable from the head section, a combination of the combustion-chamber frame, the head section and the piston defining a combustion chamber;

a motor having a shaft that extends in a first direction and outputs rotational force;

a fan;

a connection rod that connects the shaft of the motor to the fan, the connection rod having an imaginary longitudinal axis extending in the first direction, wherein a cross-section of the shaft of the motor and the connection rod cut along the imaginary longitudinal axis is symmetrical in shape with respect to the imaginary longitudinal axis; and a first tightening member engageable with the connection rod, and a second tightening member engageable with the connection rod, wherein the fan has a hub portion formed with a center hole into which the shaft of the motor is inserted, the fan being secured to the connection rod by the first tightening member engaged with the connection rod at one side of the hub portion and the second tightening member engaged with the connection rod at another side of the hub portion, the first tightening member and the second tightening member being moved toward each other with the hub portion interposed therebetween, wherein the connection rod and the first and the second tightening members are made from a same material of steel and the fan is made from aluminum.

11. The combustion-type power tool according to claim 10, wherein the connection rod has a circular cross-section anywhere along an entire length of the connection rod, the circular cross-section appearing when the connection rod is cut along a line extending in a second direction perpendicular to the first direction.

12. The combustion-type power tool according to claim 10, wherein the connection rod is formed with a hole in coaxial with the imaginary longitudinal axis, and the shaft of the motor is force-fitted into the hole of the connection rod to thereby secure the shaft of the motor to the connection rod.

13. The combustion-type power tool according to claim 10, wherein the connection rod is formed with a hole in coaxial with the imaginary longitudinal axis, and the shaft of the motor is inserted into the hole of the connection rod and secured to the connection rod with an adhesive material.

14. The combustion-type power tool according to claim 10, wherein the first tightening member and the second tightening member are threadingly engaged with the connection rod.

* * * * *